Sept. 5, 1967   E. R. RICHARDS   3,339,904
SUPPORT STRUCTURE FOR A WATER-COOLED CUPOLA FURNACE
Filed Sept. 17, 1964   2 Sheets-Sheet 1

INVENTOR.
EDWIN R. RICHARDS
BY Oscar B Brumback
his Attorney

INVENTOR.
EDWIN R. RICHARDS
BY Oscar B Brumback
his Attorney 3,339,904
SUPPORT STRUCTURE FOR A WATER-COOLED
CUPOLA FURNACE
Edwin R. Richards, Pittsburgh, Pa., assignor to Koppers Company, Inc., a corporation of Delaware
Filed Sept. 17, 1964, Ser. No. 397,254
7 Claims. (Cl. 266—32)

ABSTRACT OF THE DISCLOSURE

A metallurgical cupola comprises an upper shell, a lower shell wherein there are tuyeres, and a water-jacketed median shell portion disposed between the upper and lower shells. The water-jacketed shell has relatively thin plates and does not assume structural columnar loads; such loads are transferred from the upper shell to the lower shell by a plurality of radial external ribs cooperating with the median shell portion to subdivide it into separate cooling zones. The upper and the lower shell surfaces are cooled externally while the water-jacketed shell is cooled internally.

---

The present invention relates to cupolas and, more particularly, to improvements in metallurgical type cupolas.

In the process to make steel, metallurgical type cupolas are frequently used with a basic oxygen furnace in such a way that basic metal is first melted in the cupola, and is then transferred to a basic oxygen furnace for further processing and refining.

A metallurgical type cupola, or hot blast cupola as they are sometimes called, resembles a miniature blast furnace. However, the cupola differs from the blast furnace in that pig iron and steel scrap are melted down in a cupola, whereas iron ore is reduced in a blast furnace, and a cupola is usually considerably smaller in size than a blast furnace. In a cupola, the charge includes successive alternate layers of coke, pig iron, steel scrap, and limestone which are introduced via a charging door located usually near the top of the stack.

The cupola comprises a generally cylindrical steel shell having a plurality of tuyeres positioned near the bottom of the shell. Immediately above the tuyeres there is a zone or region which becomes extremely hot during operation of the cupola and this zone is known as the working zone.

As in a blast furnace, an air blast is introduced into the cupola above the hearth through the tuyeres which are conveniently disposed symmetrically around the periphery of the stack. During operation, the temperature generated by the burning coke within the cupola is sufficient to melt the pig iron and steel scrap and the molten metal runs downward and accumulates in the hearth at the bottom of the stack, from which it is drawn or tapped periodically or continuously.

Until recent years the cupola was a simple cylindrical steel stack lined with refractory material, having tuyeres near the bottom to inject air and a closed refractory lined bottom or hearth for collecting the molten metal. This hearth rested on hinged doors, which when dropped, emptied the cupola of its contents.

These cupolas were operated intermittently and after being used for a short time were "melted down" and the remaining contents dropped out. The lining was then patched and a new bottom made before resuming operations. This required an outage time, and usage of considerable labor and material.

As the demand for liquid pig iron grew in foundries and particularly in the making of steel, an evolution in cupola design took place. The modern cupola is capable of operating continuously for many weeks.

Heretofore, the cupola shell was lined with suitable refractory materials to protect the steel plate forming the stack. In recent years, however, the steel stack has been cooled by a film of water flowing down the outer surface of the shell, and no refractory materials have been used above the level of the tuyeres. The film of water covers the outside surface of the stack from top to bottom. A common method for initiating the film of water is to utilize a plurality of spray nozzles radially disposed around the periphery of the stack, though other methods may be used if preferred. The water is collected in a water gutter or trough at the bottom of the stack and may be redistributed several times. In some applications the film of water may be broken up into a plurality of zones, each having a fluid conduit with nozzles and a collecting trough.

It has been noticed that after prolonged periods of operation of the cupola, cracks develop in the shell. Frequently, such cracks grow to become large enough to cause a shut-down of the cupola and necessitate major reconstruction and repair of the shell. The cracks seem to originate and concentrate in the working zone, initially on the inside surface of the shell. The cracks form as horizontal lines at first, then elongate and deepen, until finally they penetrate to the outside surface of the shell. Vertical crack lines also form sometimes, but generally the most damaging breaks run in a horizontal line and sometimes these horizontal cracks spread nearly half-way around the cupola.

Why these cracks form is not entirely understood. The cracks appear to originate in the working zone or in the shell band which begins at a level about 12 inches above the tuyeres but which may extend for a distance of about 8 feet to 10 feet above this level. It is believed that the haphazard arrangement of the scrap material, which naturally occurs during charging of the material into the cupola, may cause a concentration of flame and intense heat in small localized areas of the shell. This localized heating, it is believed, causes the shell to bulge inward, but after the scrap material adjacent this localized area melts, the cause of the uneven heating is removed, and the shell metal in this localized area cools to the temperature of the adjacent shell. During a prolonged period of operation of the cupola, which in a typical case may be measured in weeks of active service, the shell material in this working zone may be subjected to successive localized heatings and coolings. With the passage of time, cracks begin to form on the inside surface in these localized areas, but, of course, the cracks are not readily detected until they appear on the outer surface, having penetrated entirely through the thickness of the surface of the shell material. A crack which has finally worked its way through the entire thickness of shell material, provides a channel through which the film of water may penetrate the shell and cause damage within the cupola and furthermore, the shell may be structurally weakened or distorted due to the cracking.

In accordance with the present invention the cupola shell includes an upper shell and a lower shell with a water jacket disposed therebetween. The lower shell contains the tuyere openings and the water jacket constitutes the working zone of the cupola shell.

The water jacket has inner and outer spaced apart plates that are relatively thinner than the upper and lower shell, and a plurality of baffles therebetween to provide internal fluid flow passages. Water courses the fluid flow passages at high velocity and readily absorbs heat from the inner wall and maintains it at a relatively low temperature. Thus, the water jacket effectively and efficiently reduces the tendency for localized hot spots to form, which also eliminates a cause of incipient internal cracking of the shell.

The upper and lower shells are structurally joined together by a plurality of external vertical ribs which also serve to support the water jacket.

For a further understanding of the present invention and for advantages and features thereof, reference may be made to the following description taken in conjunction with the accompanying drawings forming a part of this application in which.

Figure 1:
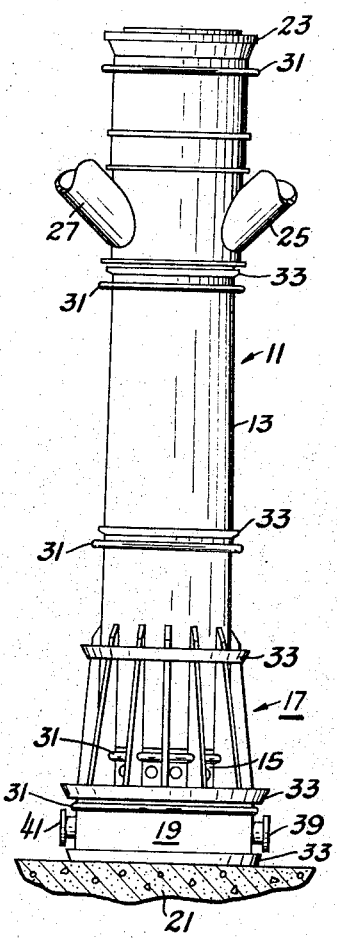
FIG. 1 is a schematic elevational view of a cupola constructed in accordance with a preferred embodiment of the present invention.

Referring to the drawings, FIG. 1 illustrates a cupola 11, constructed in accordance with the present invention, which includes: an upper shell portion or stack, designated generally as 13; a lower shell portion, designated generally as 15, which is disposed in spaced apart relation to the upper shell portion or stack 13; and a water jacket shell portion, designated generally as 17, which is interposed between the stack 13 and the lower shell portion 15. The stack 13, water jacket portion 17, and lower shell portion 15, are supported upon a conventional type hearth 19 that rests upon a suitable foundation 21.

The upper shell portion or stack 13 generally comprises a plurality of arcuate plates which are welded together to form a cylindrical tubular member, and it is generally closed at its upper end by a conventional charging section, designated generally as 23 in FIG. 1. At a convenient location near the top of the stack, it is customary to provide upwardly and outwardly extending flue gas exhaust conduits or pipes 25, 27, which may be angularly disposed around the periphery of the stack in any suitable or customary arrangement.

The plates forming the stack 13, in a typical installation, are cooled by a film or films of water which course down the outer surface.

Such film or films of water are produced generally by a plurality of nozzles 29 (see FIG. 3) conveniently mounted in each of a plurality of fluid conduits 31 encompassing the stack 13 and disposed in vertical spaced apart relation, as shown in FIG. 1.

It is also customary to provide a water gutter or trough 33 below each fluid conduit 31, and the trough 33 encompasses the stack 13 at a location just above the next adjacent lower fluid conduit, as may be noticed by referring to FIG. 1. Each water gutter or trough 33 has one or more water outlet conduits 35 (see FIG. 2) by means of which the surface cooling water is removed for further treatment or reuse in a preferred manner.

The lower shell portion 15 is provided with a series of apertures 37 adapted to receive conventional tuyeres located symmetrically around the periphery of the cupola. As is well-known, in the operation of a cupola, an air blast under a pressure of about 1 to 2½ p.s.i. is introduced through the tuyeres after combustion has commenced in the cupola, and the burning coke melts the metallic charge, converting some of the other ingredients to slag. As might be expected, the hottest zone in the cupola is immediately above the tuyeres, and this hottest zone may extend above the tuyeres for a distance of from 1–10 feet. It is in the hottest section, or working zone as it is known in the art, that most of the cracks develop in the cupola shell.

The scrap metal and other ingredients are usually introduced into the cupola through the charging section 23, located at the top of the cupola. As the scrap metal melts, it runs downwardly through the cupola and collects in the hearth portion 19 from which it is removed at a tapping spout 39. The slag forming ingredients may be removed as slag at the same time via the tapping spout 39, or the slag may be removed at a tapping spout 41, opposite the tapping spout. When the metal and slag are extracted simultaneously via the same tapping spout, the process may be continuous by using a metal and slag separator (not shown), if preferred.

In accordance with this invention, the generally cylindrical band of steel, which is the cupola shell or stack, is spaced apart from the lower shell portion 15 that contains the tuyere openings 37, by a distance which normally constitutes the working zone of the cupola. As illustrated for example in FIG. 3, the upper and lower shell portions are spaced apart by the water-jacket portion designated generally as 17. The water-jacket portion is hollow and a cooling fluid, such as water, courses the internal fluid passages in the water-jacket at high velocity, and removes heat from the inner and outer walls forming this portion.

The water-jacket portion is purposely designed not to withstand great structural loads. Its chief purpose is to more readily and effectively remove heat from the working zone than has been possible heretofore. The inner and outer walls of the water jacket, being relatively thin, transfer heat more efficiently than thicker walls which are able to withstand structural loads. Structural continuity between the upper and lower shell portions is readily provided however, by a plurality of triangularly shaped main and auxiliary vertical ribs 43, 45, which are affixed externally to the upper and lower shell portions.

Figure 4:
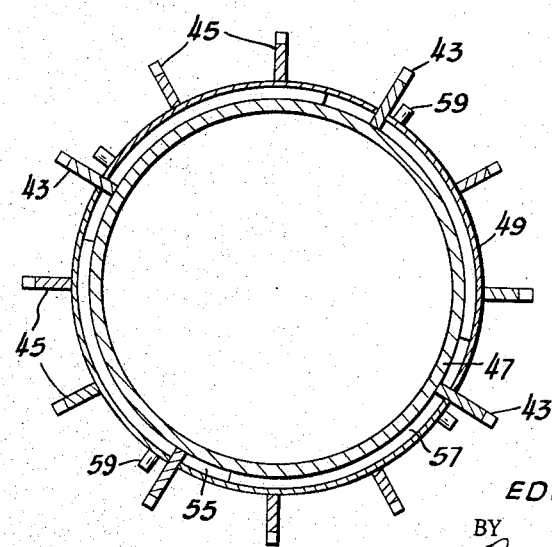
FIG. 4 is a sectional view along line IV—IV of FIG. 2.

Referring to FIG. 4, the water-jacket portion has inner and outer substantially cylindrical spaced apart walls 47, 49, respectively. The inner wall 47 is a generally continuous cylindrical plate which is disposed so that its inner surface is substantially flush with the inner surface of the stack 13 and lower shell portion 15.

Figure 3:
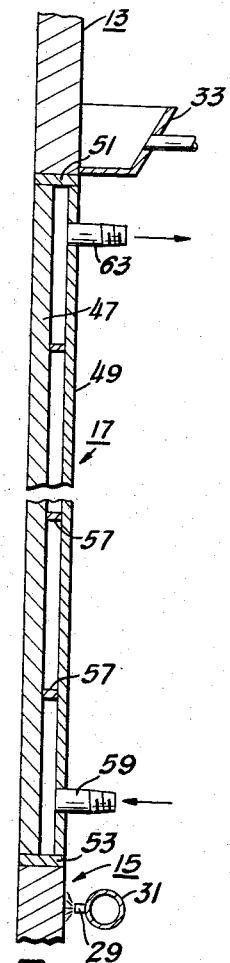
FIG. 3 is a sectional view along line III—III of FIG. 2.

In the embodiment illustrated herein, four main vertical triangular rib members 43 are welded to the inner plate 47 and are so disposed that they extend radially outward in diametric opposition. The outer plate, or wall 49, is made up of four arcuate plates which are welded to the four main rib members 43. As illustrated in FIG. 3, the top and bottom edges of the inner and outer plate members 47, 49 are welded to top and bottom sealing plates 51, 53 which enclose and thereby form an annular space or chamber 55 between each adjacent pair of vertical ribs 43. Thus, in the preferred embodiment of the invention, there are four such annular chambers 55 in the water-jacket portion.

Figure 2:
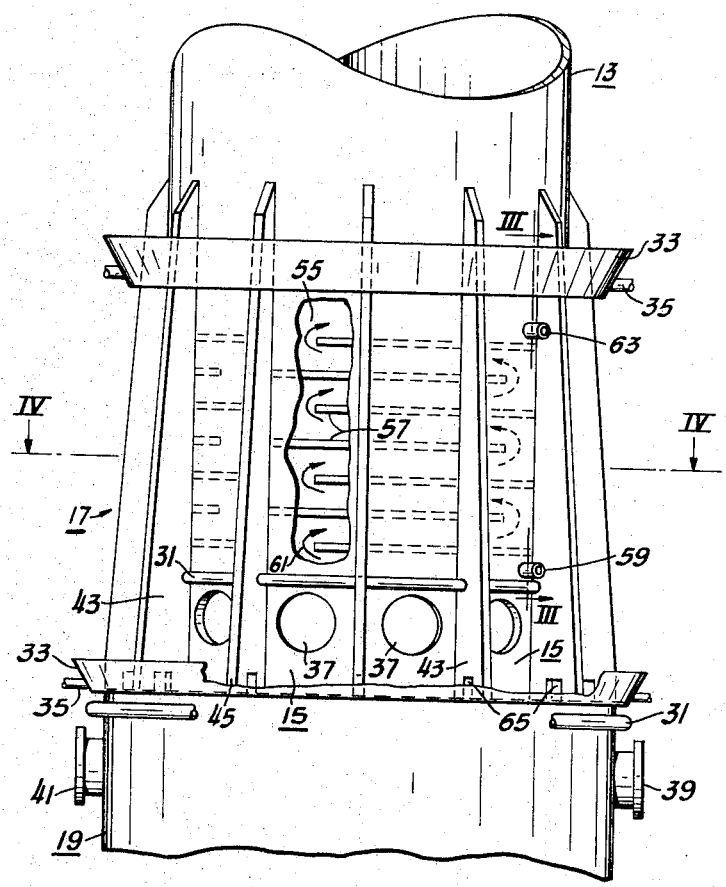
FIG. 2 is a schematic elevational view, partly broken away, of the water jacket shell portion of the cupola of FIG. 1.

In each annular chamber 55, there are a plurality of horizontally arranged baffle plates 57, which may be conveniently welded to both the inner and outer plates 47, 49 by methods known in the art. The baffles 57, as illustrated in FIGS. 2 and 4, are slightly shorter than the length of each arcuate annular space 55, and the baffles 57 are alternately arranged in staggered relation so that cooling fluid, entering the annular spaces 55, via an inlet conduit such as 59, courses upwardly in a sinuous path, through a plurality of horizontally disposed fluid passages generally as shown by the arrows 61 in FIG. 2, and emerges via an outlet conduit such as 63 located near the top of each annular space 55. An inlet conduit 59 and an outlet conduit 63 may be provided for each annular chamber 55. It should be evident, that the baffles 57 may be arranged vertically, if preferred, so that there would be a plurality of vertical fluid flow passages in each annular chamber.

It was mentioned previously that the water-jacket portion 17 is designed not to withstand great structural loads. The four main diametrically opposed vertical triangular ribs 43 overlap and are welded to the upper and lower shell portions 13, 15, and thereby provide structural continuity between the upper and lower shell portions. These four main vertical ribs also form end walls between adjacent annular chambers 55. Intermediate the adjacent pairs of vertical triangular ribs, there are disposed two auxiliary vertical ribs 45, which may be connected, as by welding, to the outer walls 49, and which also overlap and are welded to the upper and lower shell portions 13, 15, respectively. These intermediary auxiliary triangular ribs provide additional structural continuity between the upper shell portion and the lower shell portion. The bottom edge of each rib is provided with a rectangular notch 65 through which flows the water, which cools the lower shell or tuyere section 15, and which is collected in the trough 33. The bottom edge of each rib member also, may be connected as by welding, or in any suitable manner, to the hearth portion 19.

In a typical cupola, incorporating the present invention, the height of the cupola shell above the tuyeres may be as much as 40 feet; the diameter of the shell at the level of the tuyeres may be as much as 13 feet; and the height of the working zone 17 may be about 8 feet. In such a cupola, the thickness of the steel plates in the upper shell portion 13 may be about 1¼ to 1½ inches. Such a typical cupola may have as many as 12 tuyeres and as many as 12 main and intermediary vertical shell supporting ribs 43, 45.

In a typical water-jacket portion, constructed in accordance with the present invention, the inner plate 47 may be about ½ inch thick, and the outer plate 49 may be about ¼ inch thick. Thus, if the inner and outer plates 47, 49 are flush with the upper and lower cupola shell, as shown in FIG. 3, the width of the annular space or chamber 55 would be about ½ inch. The baffle plates 57, in a typical application, may be any suitable thickness, and may be spaced apart a distance designed to ensure an adequate velocity to the water flowing in the passages within the water jacket.

It is desirable to introduce cooling water into the inlet conduit 59 at such a pressure that the water circulates within the annular horizontal flow passages at a relatively high velocity, to effectively cool the inner and outer plates 47, 49. The rapidly circulating cooling water maintains the plates 47, 49 at a reasonably uniform temperature, and effectively and efficiently eliminates concentrations of heat at localized areas so that the bulges and cracks, which heretofore developed, do not form.

While in a preferred embodiment of the invention the inner and outer plates 47, 49 of the water-jacket portion 17 are disposed flush with the upper and lower shell surfaces, this is merely for convenience, and if preferred, the water-jacket portion may have a wider annular space 55 than suggested herein, and both the inner and outer plates may be thinner or thicker than suggested.

The water-jacket shell portion in the working zone of a cupola, constructed in accordance with the present invention, effectively dissipates heat which tends to concentrate in local areas and which, it is believed, is a primary cause of localized bulging and incipient cracking of the inner shell of cupolas used heretofore.

While in a preferred embodiment of the invention, illustrated in the drawings, the inner wall 47 is a continuous cylindrical member, and the outer plate 49 is made up of four quandrantal plates, it is evident that the water-jacket portion may be made of a plurality of individual hollow sections, which may be effectively joined together and to the upper and lower shell portions in any suitable manner known in the art. When so made, one or more individual water-jacket sections, if necessary, may be removed and replaced, or repaired in situ much more readily and with a considerable overall saving of time and expense in the operation of the cupola.

I claim:
1. A metallurgical type cupola comprising:
 (a) an upper vertical shell portion;
 (b) a lower vertical shell portion substantially coaxial with and spaced apart from said upper shell portion;
 (c) a water-jacketed shell portion disposed coaxially between said upper and lower shell portions;
 (d) a plurality of vertical members structurally joining together said upper and lower shell portions;
 (e) means to flow coolant into and out of said water-jacketed shell portion.

2. The invention of claim 1 wherein:
 (a) at least one of said vertical supporting members forms a vertical baffle in and vertically subdivides said water-jacketed shell portion.
3. The invention of claim 1 wherein:
 (a) a plurality of horizontal baffles are disposed in said water-jacketed shell portion in such a manner that a labyrinth-type of flow path for coolant therein is achieved.
4. The invention of claim 1 wherein:
 (a) a plurality of said vertical members vertically subdivide said water-jacketed shell portion into a plurality of separately cooled sections; and including
 (b) means to flow coolant into and out of each respective water-jacketed shell portions.
5. The invention of claim 4 including:
 (a) a plurality of horizontal baffles in each said separate water-jacketed shell portions thereby establishing a labyrinth-type of flow path for said coolant therein.
6. The invention of claim 4 including:
 (a) means for flowing coolant fluid down the outer surface of said upper and said lower shells to cool the same.
7. A metallurgical-type cupola shell comprising:
 (a) a cylindrical upper shell portion;
 (b) a cylindrical lower shell portion wherein there are a plurality of angularly spaced apart tuyere openings, said upper and lower shell portions being arranged in substantially coaxial spaced apart relation;
 (c) a cylindrical shell portion disposed intermediate said upper and lower shell portions and including a continuous cylindrical inner plate with a plurality of vertical end wall members joined to said inner plate and projecting radially therefrom, together with a plurality of cylindrical outer plate members spaced apart from said inner wall and joined to said end wall members, and with top and bottom plate members joined perimetrically to said inner and outer plates, whereby a plurality of fluid chambers are formed in said intermediary cylindrical shell portion;
 (d) a plurality of spaced apart baffle members disposed in each said chamber and forming a plurality of fluid flow passages in each chamber;
 (e) a fluid inlet conduit and a fluid outlet conduit disposed in spaced apart relation and communicating with each chamber;
 (f) a plurality of vertical rib members structurally joining together said upper and lower shell portions.

References Cited
UNITED STATES PATENTS

| | | |
|---|---|---|
| 2,176,336 | 10/1939 | Grotewohl. |
| 2,238,036 | 4/1941 | Clutts. |
| 2,252,605 | 8/1941 | Wick. |
| 2,671,658 | 3/1954 | Moore _____ 266—32 |
| 2,697,598 | 12/1954 | Affleck _____ 266—32 |
| 2,711,311 | 6/1955 | Affleck _____ 266—32 |
| 2,770,451 | 11/1956 | Almond _____ 266—32 X |
| 2,805,851 | 9/1957 | Becker _____ 266—32 |
| 2,824,731 | 2/1958 | Schwengel _____ 266—32 |
| 2,900,180 | 8/1959 | Ortgies _____ 266—32 |
| 2,903,495 | 9/1959 | Dickson. |

J. SPENCER OVERHOLSER, *Primary Examiner.*

JOHN F. CAMPBELL, *Examiner.*

R. F. DROPKIN, E. MAR, *Assistant Examiners.*